US010821864B2

(12) United States Patent
Damerow et al.

(10) Patent No.: US 10,821,864 B2
(45) Date of Patent: Nov. 3, 2020

(54) MODULAR SEATING ASSEMBLY

(71) Applicant: Ford Global Technologies, LLC, Dearborn, MI (US)

(72) Inventors: Robert Damerow, Garden City, MI (US); Carol Diane Casey, Dearborn, MI (US); Andrew Matusko, Dexter, MI (US); Johnathan Andrew Line, Northville, MI (US); Steven Carnago, Clinton Township, MI (US); Walter Woodward, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 16/223,157

(22) Filed: Dec. 18, 2018

(65) Prior Publication Data
US 2020/0189430 A1 Jun. 18, 2020

(51) Int. Cl.
*A47C 7/02* (2006.01)
*B60N 2/68* (2006.01)
*B60N 2/01* (2006.01)
*B60N 2/64* (2006.01)

(52) U.S. Cl.
CPC ............ *B60N 2/682* (2013.01); *B60N 2/01* (2013.01); *B60N 2/64* (2013.01)

(58) Field of Classification Search
CPC .......... A47C 7/18; B60N 2/7005; B60N 2/68; B60N 2/70; B60N 2/64; B60R 7/043
USPC ............ 297/452.23, 452.22, 452.21, 452.48, 297/188.1, 188.09, 232, 452.26
See application file for complete search history.

(56) References Cited

U.S. PATENT DOCUMENTS

| | | | |
|---|---|---|---|
| 4,861,104 A * | 8/1989 | Malak ................. | B60N 2/5825 297/218.3 |
| 8,696,067 B2 * | 4/2014 | Galbreath ............. | B60N 2/686 297/452.1 |
| 8,998,309 B2 * | 4/2015 | Galbreath ............... | B60N 2/70 264/46.4 |
| 9,365,143 B2 * | 6/2016 | Sachs ....................... | B60N 2/70 |
| 9,517,709 B2 * | 12/2016 | Kitajima ................. | B60N 2/58 |
| 10,065,535 B1 * | 9/2018 | Line .................... | B60N 2/3013 |
| 2002/0096915 A1 * | 7/2002 | Haupt ............... | B60H 1/00285 297/180.13 |
| 2015/0165950 A1 | 6/2015 | Sachs et al. | |
| 2015/0291070 A1 * | 10/2015 | Kitajima .............. | B60N 2/7017 297/452.21 |
| 2015/0306978 A1 * | 10/2015 | Watanabe ............. | B60N 2/062 297/344.1 |
| 2015/0329030 A1 * | 11/2015 | Wiegelmann ........... | B60N 2/64 297/452.38 |

(Continued)

FOREIGN PATENT DOCUMENTS

DE 102010024207 A1 12/2011

*Primary Examiner* — Chi Q Nguyen
(74) *Attorney, Agent, or Firm* — David Coppiellie; Price Heneveld LLP

(57) ABSTRACT

A vehicle seating assembly includes a seat having a seat frame and a seat foam member, a seat trim assembly disposed over the seat foam member, a seat connector, and a seatback. The seatback includes a seatback frame. First and second seatback foam members are disposed around the seatback frame. A seatback trim assembly is disposed over the first and second seatback foam members. A seatback connector is operably coupled to the seat connector.

17 Claims, 14 Drawing Sheets

(56) References Cited

U.S. PATENT DOCUMENTS

| | | | |
|---|---|---|---|
| 2015/0336491 A1* | 11/2015 | Abe | B60N 2/58 |
| | | | 297/452.48 |
| 2015/0360597 A1* | 12/2015 | Galbreath | B32B 5/26 |
| | | | 297/452.38 |
| 2016/0207433 A1* | 7/2016 | Kondrad | B60N 2/62 |
| 2017/0283070 A1* | 10/2017 | Hall | B60N 2/64 |
| 2017/0320415 A1 | 11/2017 | Mueller et al. | |
| 2018/0118067 A1 | 5/2018 | Line et al. | |
| 2018/0215294 A1* | 8/2018 | Hosbach | B60N 2/68 |
| 2019/0010301 A1* | 1/2019 | Ichimura | C08G 18/7671 |
| 2019/0168645 A1* | 6/2019 | Jones | B60N 2/4221 |
| 2019/0217746 A1* | 7/2019 | Okubo | B60N 2/68 |

\* cited by examiner

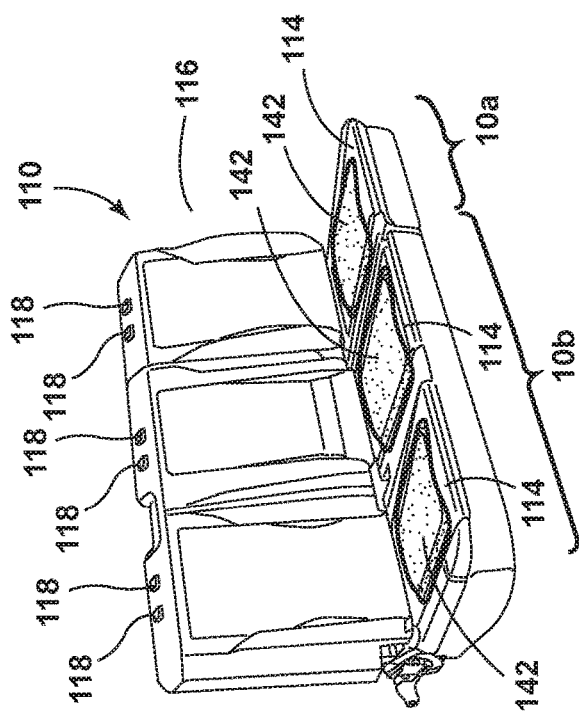
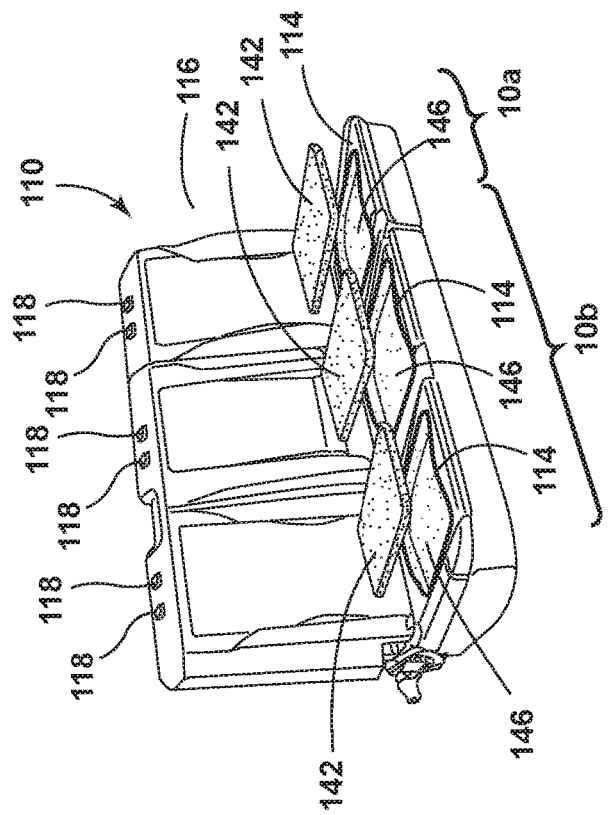

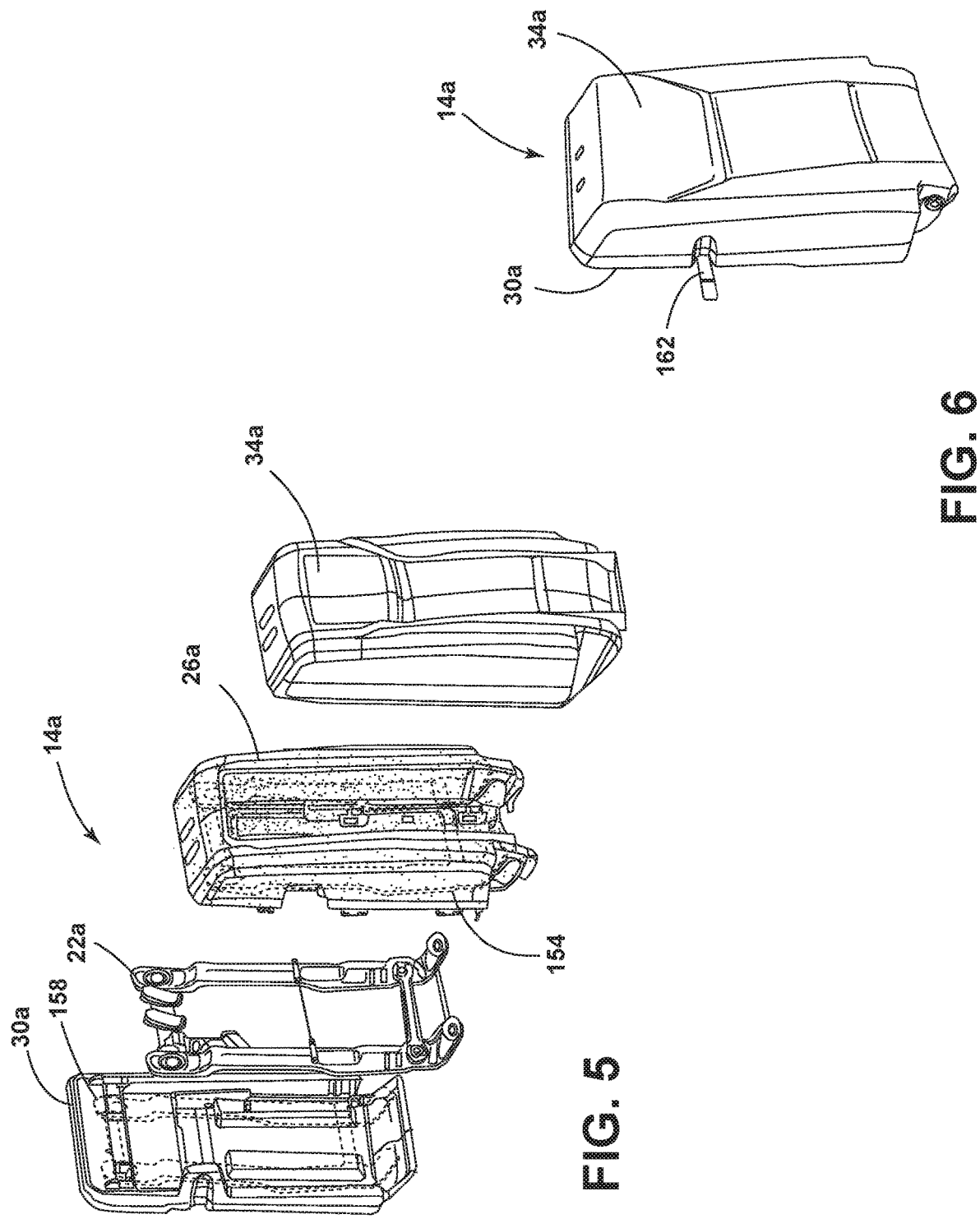

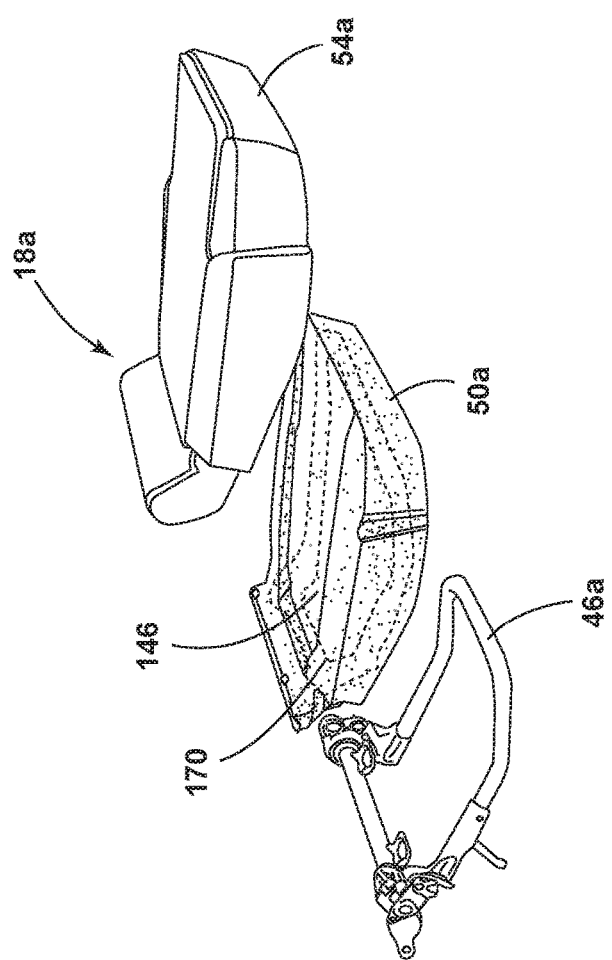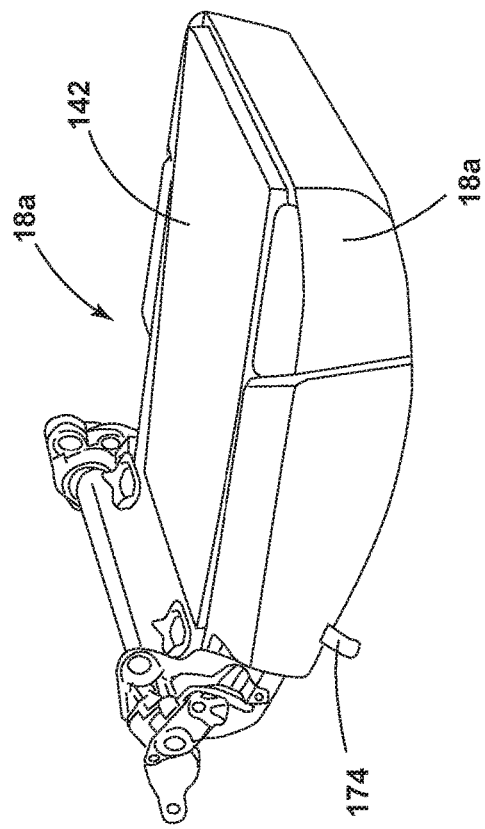

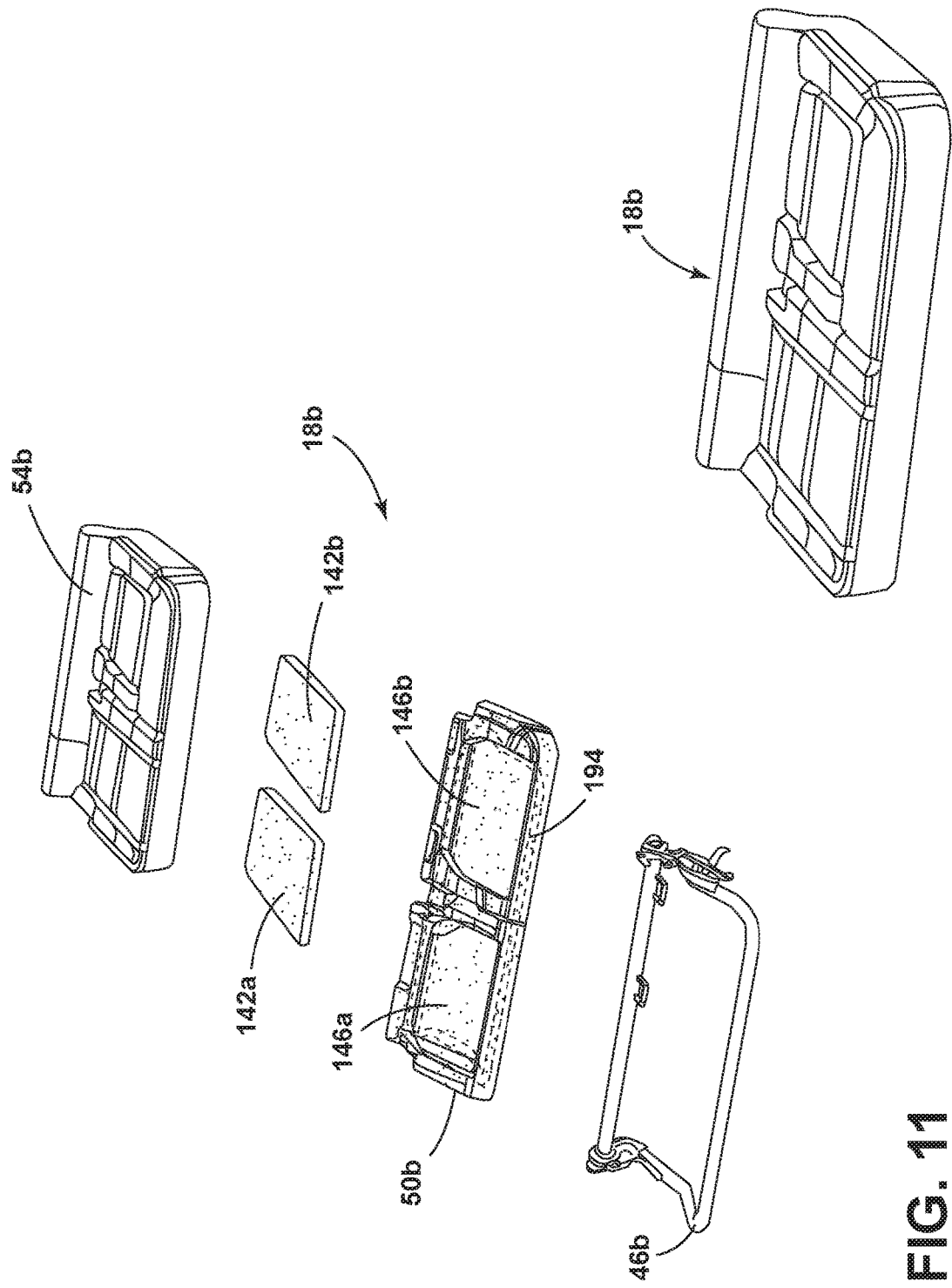

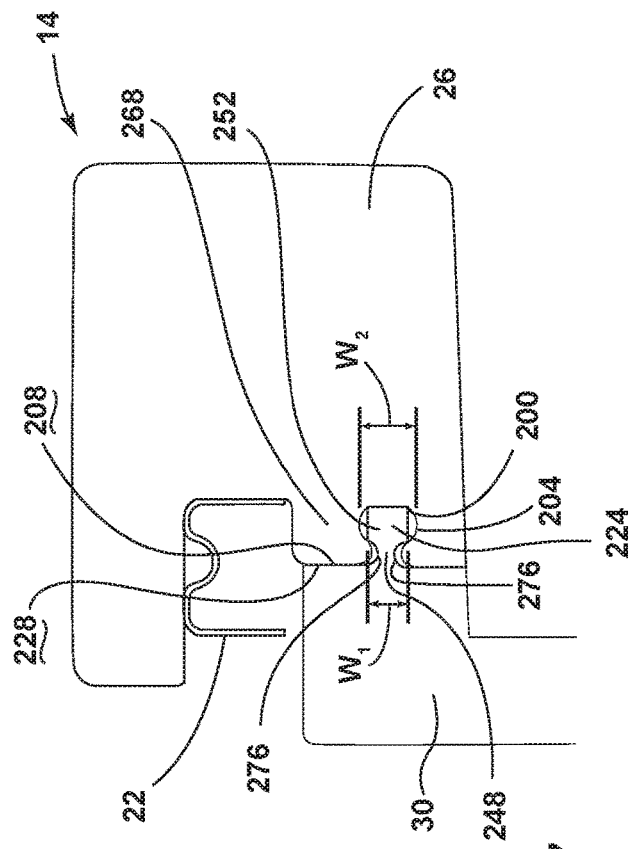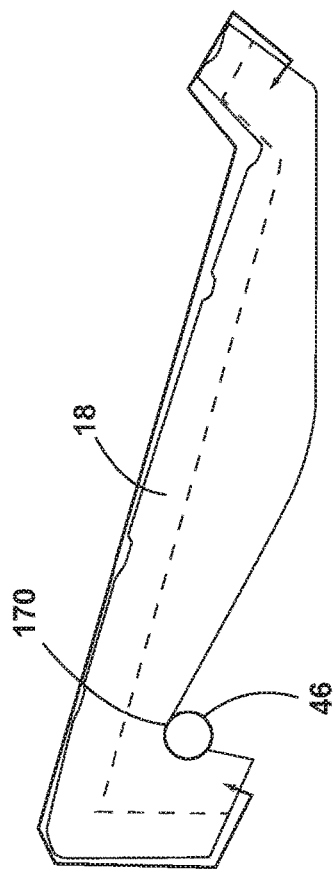

MODULAR SEATING ASSEMBLY

FIELD OF THE DISCLOSURE

The present disclosure generally relates to vehicle seating assemblies, and more particularly to vehicle seating assemblies having modular parts.

BACKGROUND OF THE DISCLOSURE

As manufacturers seek to increase the efficiency of a vehicle assembly process, manufacturers desire seating assemblies having modular parts. Conventional vehicle seating assemblies may utilize hundreds of parts that may be assembled into a final vehicle seating assembly. A Just-In-Time (JIT) assembly process may be utilized to achieve a completed vehicle seating assembly. Using the JIT assembly process, it may be advantageous to provide a vehicle seating assembly with modular parts to increase efficiency of a vehicle assembly process. Modular parts of the vehicle seating assembly may be sourced from locations other than a JIT final assembly facility. An improved vehicle seating assembly design including modular parts may achieve the needs of a vehicle seating assembly while adapting to the JIT assembly process.

SUMMARY OF THE DISCLOSURE

According to a first aspect of the present disclosure, a vehicle seating assembly includes a seat having a seat frame and a seat foam member, a seat trim assembly disposed over the seat foam member, a seat connector, and a seatback. The seatback includes a seatback frame. First and second seatback foam members are disposed around the seatback frame. A seatback trim assembly is disposed over the first and second seatback foam members. A seatback connector is operably coupled to the seat connector.

Embodiments of the first aspect of the disclosure can include any one or a combination of the following features:
- an interference fit between the first and second seatback foam members;
- the interference fit includes a trench and dart arrangement;
- the first seatback foam member is a front seatback foam member;
- the second seatback foam member is a rear seatback foam member;
- the seat frame includes a tubular member, and wherein the seat foam member includes a depression configured to receive the tubular member;
- the seat foam member includes a cutaway portion configured to receive a seat cushion;
- the vehicle seating assembly includes a bench seating assembly;
- the bench seating assembly includes a seat foam member having first and second cutaway portions for receiving respective first and second seat cushions; and
- the vehicle seating assembly is one of a plurality of vehicle seating assemblies, the seat is one of a plurality of seats, and the seatback is one of a plurality of seatbacks, and the plurality of seats and the plurality of seatbacks are interchangeable among the plurality of vehicle seating assemblies.

According to a second aspect of the present disclosure, a vehicle includes first, second, third, and fourth seating assemblies. A first cabin location is configured to receive one or more of the first, second, third, and fourth seating assemblies. A second cabin location is configured to receive one or more of the first, second, third, and fourth seating assemblies. The first, second, and third seating assemblies include interchangeable seats and interchangeable seatbacks.

Embodiments of the second aspect of the disclosure can include any one or a combination of the following features:
- the first, second, and third seating assemblies include single occupant seating assemblies;
- the fourth seating assembly includes a double occupant seating assembly;
- the first cabin location includes a second seating row and wherein the second cabin location includes a third seating row;
- the interchangeable seats include a seat foam member and a tubular support structure disposed within a channel in the seat foam member;
- the interchangeable seatbacks include first and second seatback foam members surrounding a seatback frame; and
- the single occupant seating assemblies each comprise a seat foam member including a cutaway portion for receiving a seat cushion and wherein the double occupant seating assembly comprises a seat foam member including first and second cutaway portions for receiving first and second seat cushions, wherein the seat cushions received by the single occupant seating assemblies are interchangeable with the first and second seat cushions received by the double occupant seating assemblies.

According to a third aspect of the present disclosure, a vehicle seating assembly includes a seat having a molded seat foam member that defines an open seat section and includes a seat frame. A seat trim assembly is coupled to a seating surface of the molded seat foam member. A seat cushion is disposed in the open seat section. A seatback includes a molded seatback foam member that defines an open seatback section and includes a seatback frame. A seatback trim assembly is coupled to a seating surface of the molded seatback foam member. A seatback cushion is disposed in the open seatback section.

Embodiments of the third aspect of the disclosure can include any one or a combination of the following features:
- the seat trim assembly is disposed between the molded seat foam member and the seat cushion; and
- the seat is one of a plurality of seats, wherein the seatback is one of a plurality of seatbacks, and wherein any one seat of the plurality of seats and any one seatback of the plurality of seatbacks may be combined to form a vehicle seating assembly disposed in a first cabin location or a second cabin location.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 3A is a perspective view of a bench seating assembly with interchangeable cushions, according to an embodiment;

FIG. 3B is a perspective view of the bench seating assembly of FIG. 3A with interchangeable cushions removed from the cutaway portions, according to an embodiment;

FIG. 5 is an exploded perspective view of a single occupant seatback, according to an embodiment;

FIG. 6 is a perspective view of a single occupant seatback, according to an embodiment;

FIG. 7 is an exploded perspective view of a single occupant seat, according to an embodiment;

FIG. 8 is a perspective view of a single occupant seat, according to an embodiment;

FIG. 11 is an exploded perspective view of a double occupant seat, according to an embodiment;

FIG. 12 is a perspective view of a double occupant seat, according to an embodiment;

FIG. 17 is a cross-sectional view of a seatback, according to an embodiment;

FIG. 18 is a cross-sectional view of a seat, according to an embodiment;

DETAILED DESCRIPTION

Figure 1:
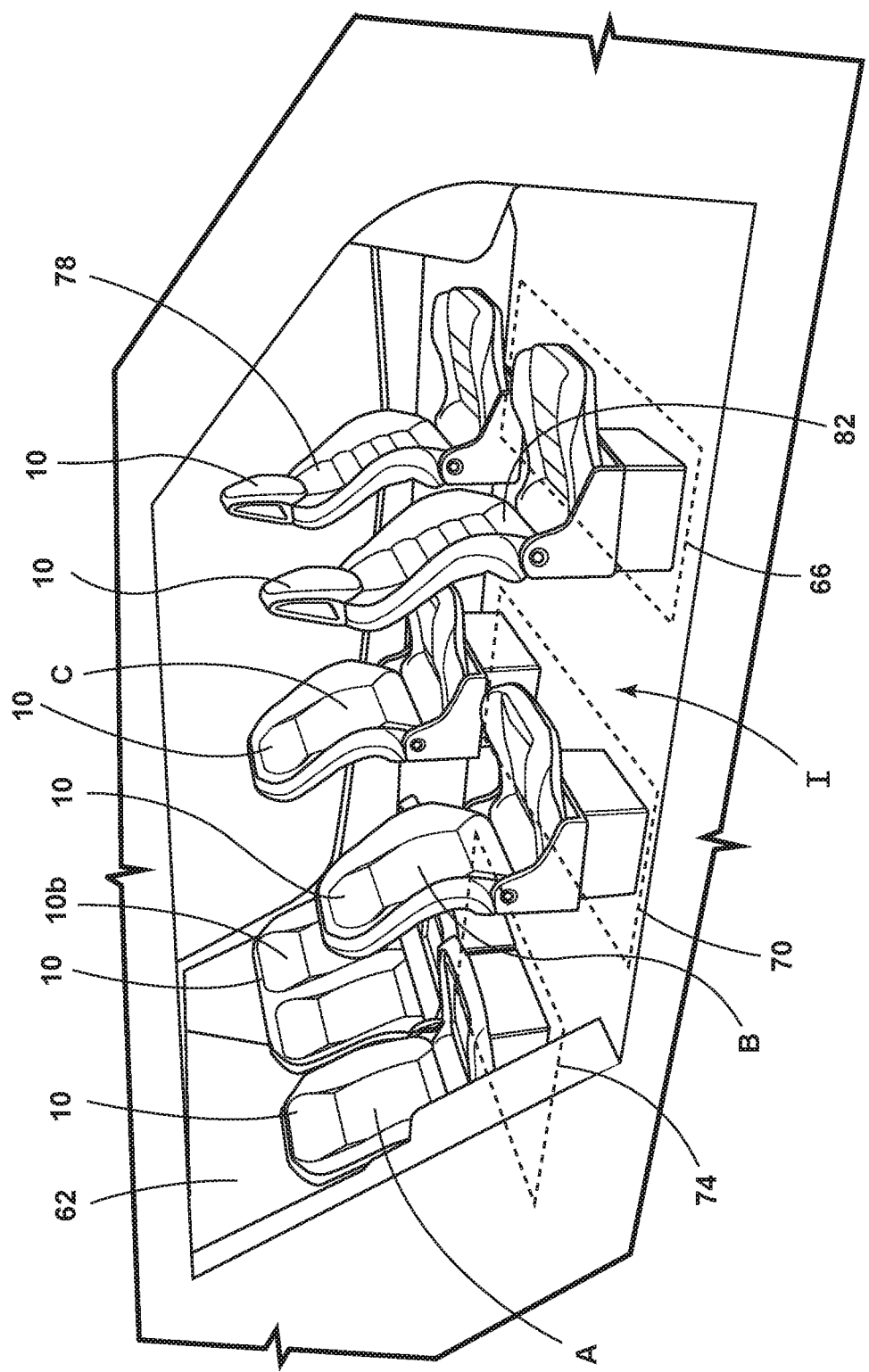
FIG. 1 is a perspective view of a vehicle cabin with first seating arrangement, according to an embodiment.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle cabin 62 with a first seating arrangement I is shown. The vehicle cabin 62 may include seating assemblies 10 arranged in a front row 66, a middle row 70, and a back row 74. The front row 66 may include a driver seating assembly 78 and a passenger seating assembly 82. The back row 74 may include a first single occupant seating assembly A and a double occupant seating assembly 10b. The middle row may include a second single occupant seating assembly B and a third single occupant seating assembly C.

Figure 2:
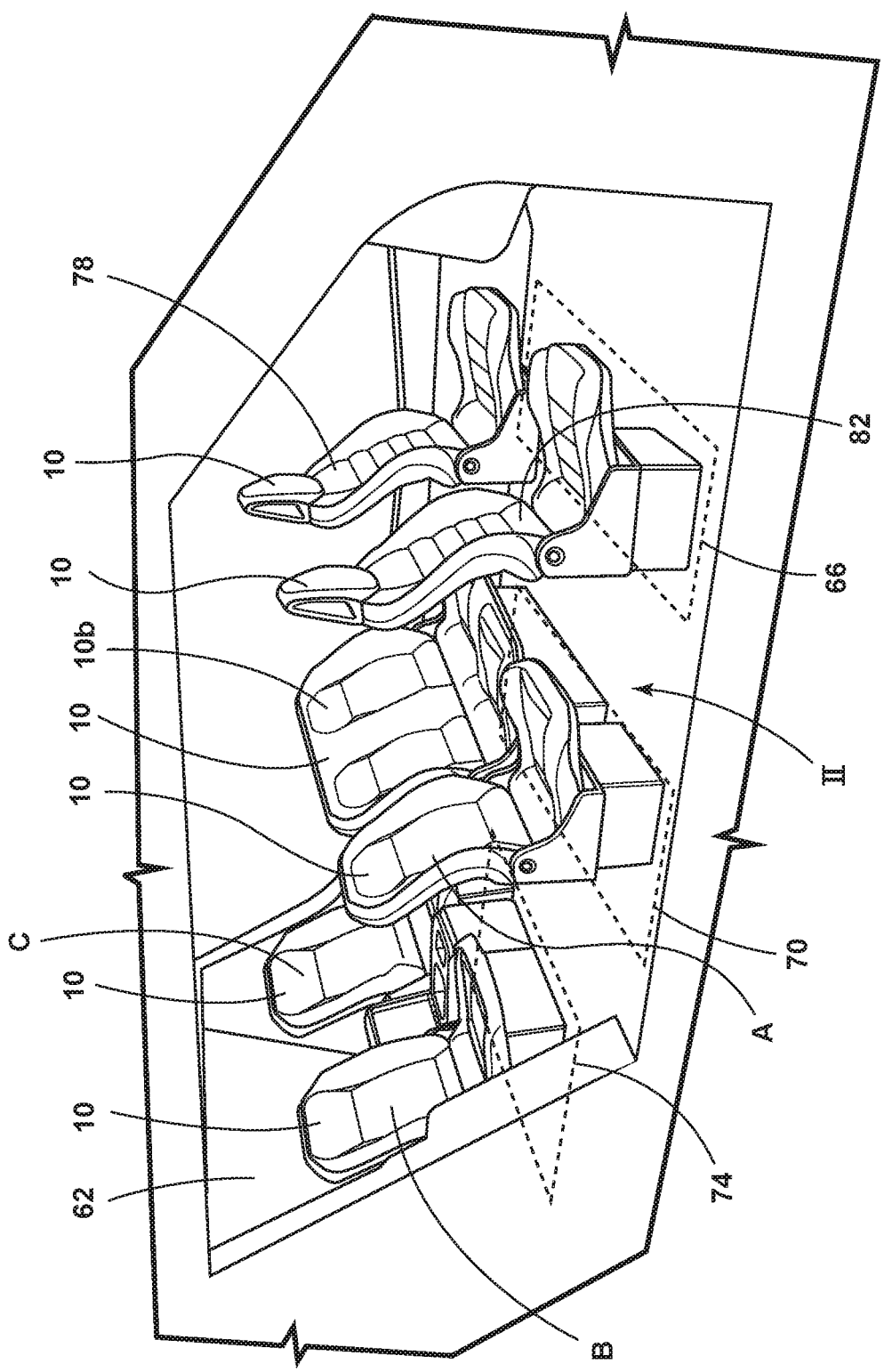
FIG. 2 is a perspective view of a vehicle cabin with a second seating arrangement, according to an embodiment.

Referring to FIG. 2, a vehicle cabin 62 with a second seating arrangement II is shown. The vehicle cabin 62 may include seating assemblies 10 arranged in a front row 66, a middle row 70, and a back row 74. The front row 66 may include a driver seating assembly 78 and a passenger seating assembly 82. The middle row 70 may include a first single occupant seating assembly A and a double occupant seating assembly 10b. The back row 74 may include a second single occupant seating assembly B and a third single occupant seating assembly C.

Conventional seating assemblies for middle rows and back rows in vehicle cabins may be assembled using a complex, "one component at a time" strategy. In some instances, a conventional vehicle seating assembly may include many parts. The many parts may include structural components, fasteners, cushions, trim, headrest components, and other parts. The many conventional seating assembly parts may be kept in an inventory at an original equipment manufacturer's (OEM's) vehicle assembly facility. The many parts may be assembled into a conventional seating assembly using a complex assembly sequence involving many steps and operators.

It may be desirable to minimize the number of seating assembly parts at the OEM's vehicle assembly facility. Further, it may be desirable to provide interchangeable seatback modules and interchangeable seat modules for assembly into vehicle seating assemblies at an OEM's vehicle assembly facility. Thus, an OEM may fasten an interchangeable seatback module to an interchangeable seat module to provide a seating assembly during the vehicle assembly process. The JIT assembly process may be used by an OEM at the vehicle assembly facility. As such, interchangeable seatback modules and interchangeable seat modules may be fastened together to create a seating assembly during a JIT vehicle assembly process.

Figure 3:
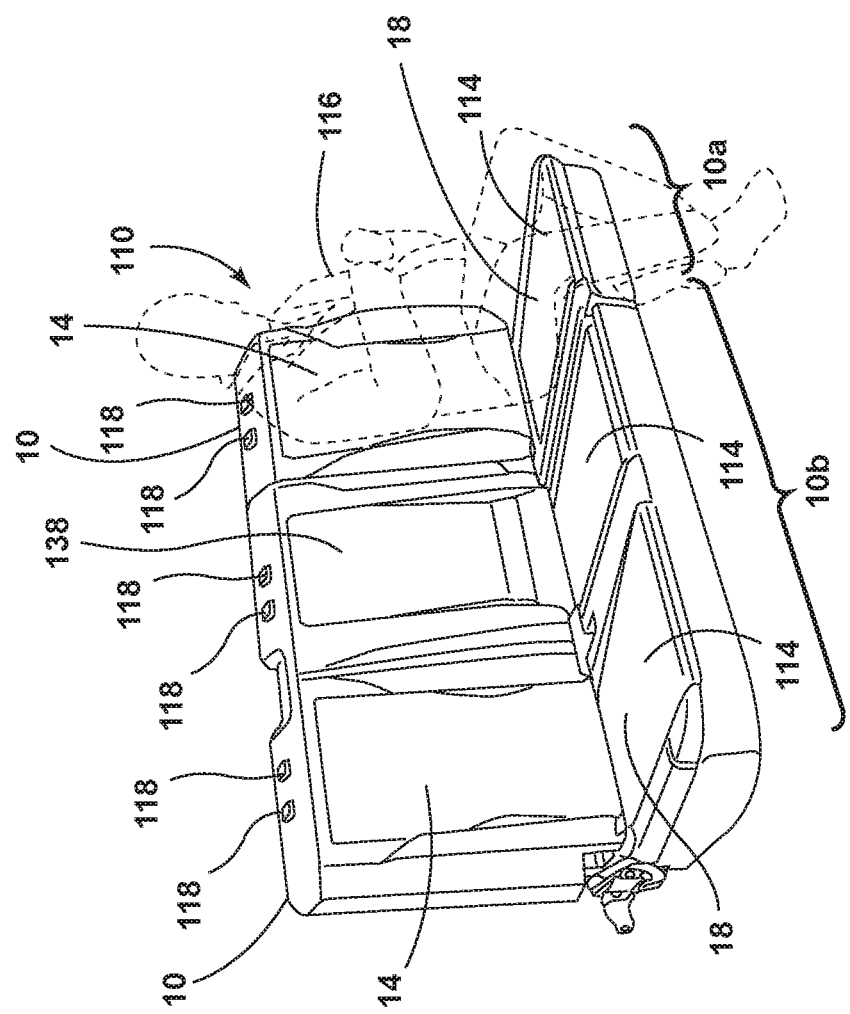
FIG. 3 is a perspective view of a bench seating assembly, according to an embodiment.

Referring now to FIG. 3, seating assemblies 10 having seatbacks 14 and seats 18 are shown. The arrangement of seating assemblies 10 show in FIG. 3 may be referred to as a bench seating assembly 110. A bench seating assembly 110 may include a single occupant seating assembly 10a positioned generally adjacent to a double occupant seating assembly 10b. The bench seating assembly 110 may provide seating spaces 114 for three occupants 116.

Referring to FIGS. 3A and 3B, in some examples, similarly sized interchangeable cushions 142 may be inserted in similarly sized cutaway portions 146 of the single occupant seating assembly 10a and the double occupant seating assembly 10b. An interchangeable cushion 142 may be inserted into any one or more of the similarly sized cutaway portions 146 in the single occupant seating assembly 10a and the double occupant seating assembly 10b.

Figure 4:
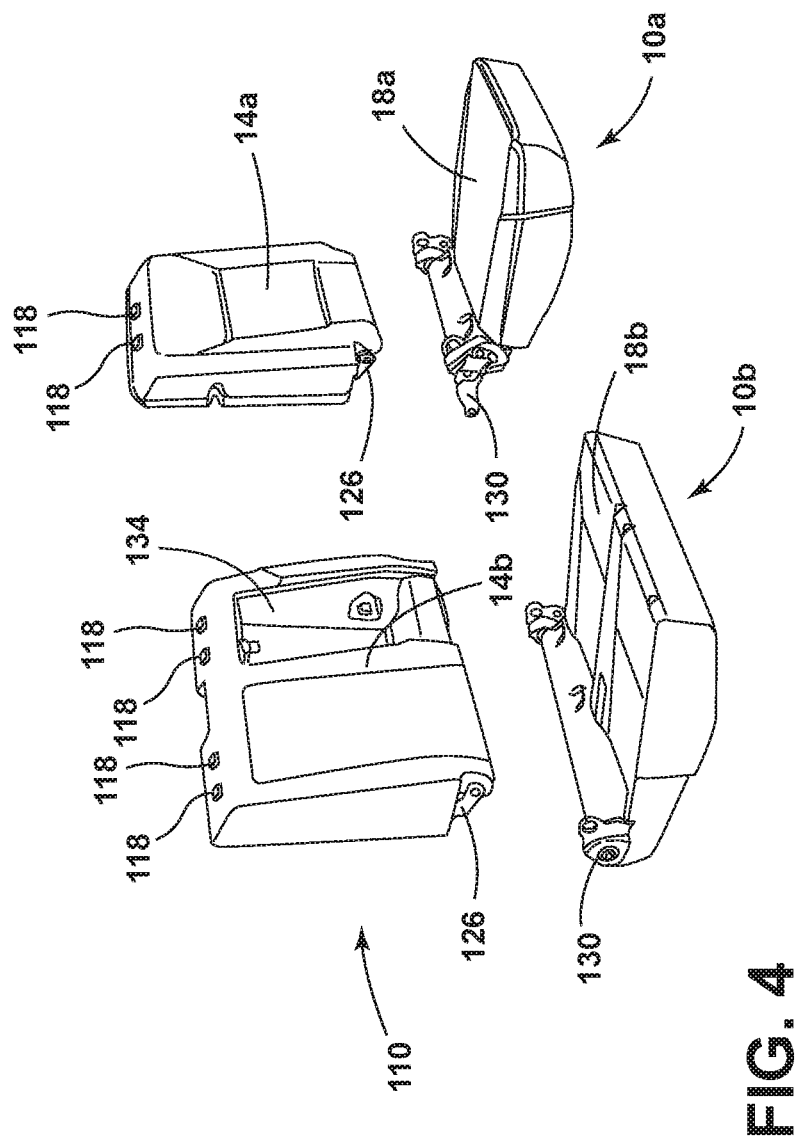
FIG. 4 is an exploded perspective view of the bench seating assembly of FIG. 3, according to an embodiment.

Referring to FIG. 4, an unassembled bench seating assembly is shown. The unassembled bench seating assembly 110 may include a single occupant seating assembly 10a and a double occupant seating assembly 10b. The single occupant seating assembly 10a may include a single occupant seatback 14a (also referred to as a single occupant seatback module) and a single occupant seat 18a (also referred to as a single occupant seat module). The double occupant seating assembly 10b may include a double occupant seatback 14b (also referred to as a double occupant seatback module) and a double occupant seat 18b (also referred to as a double occupant seat module). The single occupant seatback 14a and the single occupant seat 18a may arrive at an assembly plant as separate parts and may be assembled into a single occupant seating assembly 10a at the assembly plant. Similarly, the double occupant seatback 14b and the double occupant seat 18b may arrive at an assembly plant as separate parts and may be assembled into a double occupant seating assembly 10b at the assembly plant. Further, the single occupant seating assembly 10a may positioned adjacent to the double occupant seating assembly at the assembly plant to create a bench seating assembly 110. As such, the bench seating assembly 110 may include four modular parts (single occupant seatback 14a, single occupant seat 18a, double occupant seatback 14b, double occupant seat 18b) that may be conveniently assembled at the assembly plant.

Figure 4A:
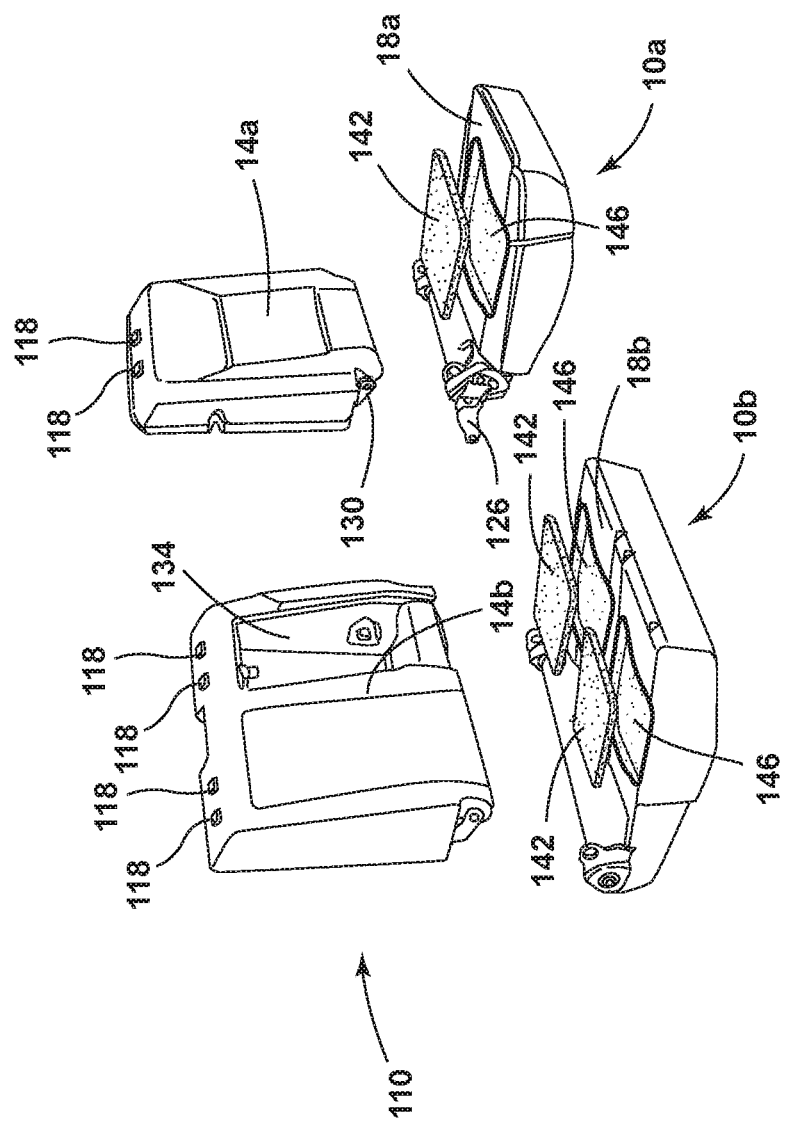
FIG. 4A is an exploded perspective view of a bench seating assembly with interchangeable cushions removed from the cutaway portions, according to an embodiment.

Referring to FIG. 4A, an exploded view of the bench seating assembly 110 shows the interchangeable cushions 142 removed from the cutaway portions 146.

With reference again to FIG. 4, the single occupant seatback 14a may include headrest rod guides 118. The single occupant seatback 14a may include seatback connectors (brackets 126). The single occupant seatback connectors (brackets 126) may be coupled to the single occupant seat connectors (brackets 130) for attachment of the single occupant seatback 14a to the single occupant seat 18a. Similarly, the double occupant seatback 14b may include headrest guides 118. The double occupant seatback 14b may include seatback connectors (brackets 126). The double occupant seatback connectors (brackets 126) may be coupled to the double occupant seat connectors (brackets 130) for attachment of the double occupant seatback 14b to the double occupant seat 18b. In some examples, the double occupant seatback 14b may include a hollow portion 134 for receiving a storable armrest 138 (FIG. 3).

Referring now to FIG. 5, an exploded view of a single occupant seatback 14a is shown. The single occupant seatback 14a may include a single occupant seatback frame 22a, a single occupant first seatback foam member 26a, a single occupant second seatback foam member 30a, and a single occupant seatback trim assembly 34a. The single occupant first seatback foam member 26a and the single occupant second seatback foam member 30a may be press fit together to surround the single occupant seatback frame 22a. A first depression 154 may be molded into the single occupant first seatback foam member 26a. A second depression 158 may be molded into the second seatback foam member 30a. When the single occupant first seatback foam member 26a is attached to the second seatback foam member 30a, then the first depression 154 and the second depression 158 may form a space for the single occupant seatback frame 22a. The single occupant seatback trim assembly 34a may be disposed over the first and second single occupant seatback foam members 26a, 30a and the single occupant seatback frame 22a. In various examples, the single occupant first seatback foam member 26a may be referred to as the front seatback foam member. In various examples, the single occupant second seatback foam member 30a may be referred to as the back seatback foam member. As such, the single occupant seatback 14a may be conveniently assembled with few parts.

Referring to FIG. 6, an example of the single occupant seatback 14a that may include the parts shown in FIG. 5 is shown. The single occupant seatback 14a may include a tab 162 for positioning the single occupant seatback 14a.

Referring to FIG. 7, an exploded view of a single occupant seat 18a is shown. The single occupant seat 18a may include a single occupant seat frame 46a, a single occupant seat foam member 50a, and a single occupant seat trim assembly 54a. The single occupant seat foam member 50a may include a cutaway portion 146 for receiving a cushion 142 (FIGS. 3B, 4A). In various examples, the cushion 142 may be disposed on the single occupant seat trim assembly 54a and within a cutaway portion 146 of the single occupant seat foam member 50a and/or within a cutaway portion 146 of the single occupant seat trim assembly 54a. A depression 170 may be molded into the single occupant seat foam member 50a to receive the single occupant seat frame 46a. The single occupant seat frame 46a may include a tubular structure. As such, the single occupant seat 18a may be conveniently assembled with few parts.

With reference to FIG. 8, an example of the single occupant seat 18a that may include the parts shown in FIG. 7 is shown. The single occupant seat 18a may include a tab 174 for positioning the single occupant seat 18a.

Figure 9:
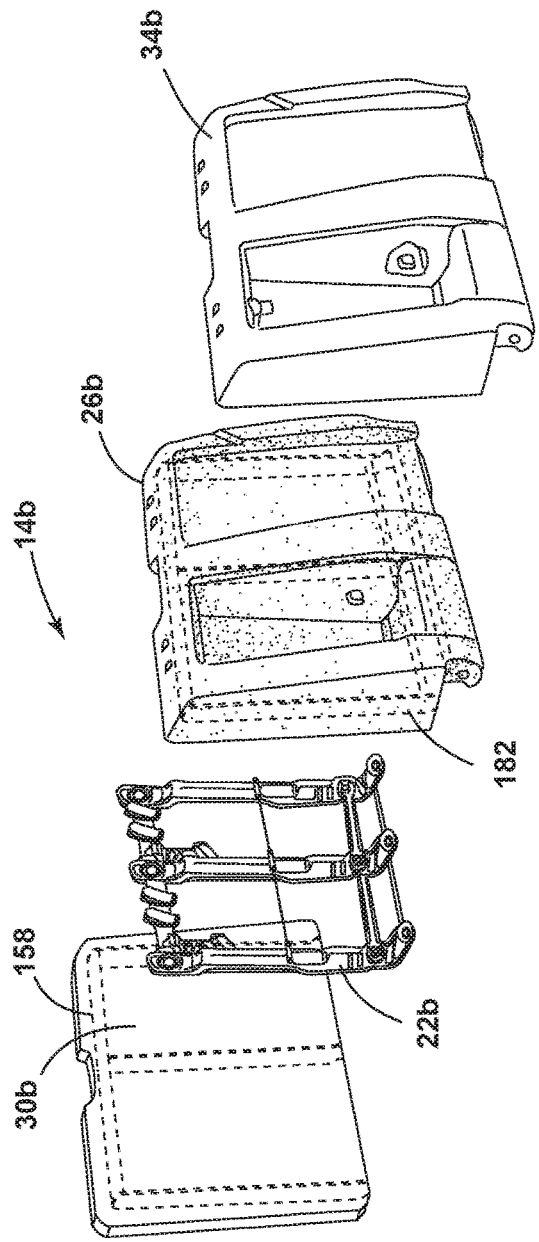
FIG. 9 is an exploded perspective view of a double occupant seatback, according to an embodiment.

With reference to FIG. 9, an exploded view of a double occupant seatback 14b is shown. The double occupant seatback 14b may include a double occupant seatback frame 22b, a first double occupant seatback foam member 26b, a second double occupant seatback foam member 30b, and a double occupant seatback trim assembly 34b. The first double occupant seatback foam member 26b and the second double occupant seatback foam member 30b may be press fit together to surround the double occupant seatback frame 22b. A first depression 182 may be molded into the first double occupant seatback foam member 26b. A second depression 158 may be molded into the second double occupant seatback foam member 30b. When the first double occupant seatback foam member 26b is attached to the second double occupant seatback foam member 30b, the first depression 182 and the second depression 158 may provide space for the double occupant seatback frame 22b. The trim assembly 34b may be disposed over the first double occupant seatback foam member 26b, the second double occupant seatback foam member 30b, and the double occupant seatback frame 22b. In various examples, the first double occupant seatback foam member 26b may be referred to as the front seatback foam member. In various examples, the second double occupant seatback foam member 30b may be referred to as the back seatback foam member. As such, the double occupant seatback 14b may be conveniently assembled with few parts.

Figure 10:
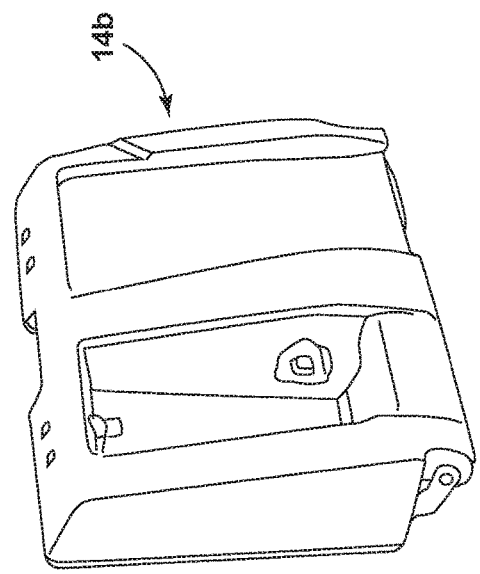
FIG. 10 is a perspective view of a double occupant seatback, according to an embodiment.

With reference to FIG. 10, an example of the double occupant seatback 14b that may include the parts shown in FIG. 9 is shown.

With reference to FIG. 11, an exploded view of a double occupant seat 18b is shown. The double occupant seat 18b may include a double occupant seat frame 46b, a double occupant seat foam member 50b, and a double occupant seat trim assembly 54b. A first seat cushion 142a and a second seat cushion 142b may be disposed between the double occupant seat foam member 50b and the double occupant seat trim assembly 54b. The double occupant seat foam member 50b may include a first cutaway portion 146a and second cutaway portion 146b for receiving a respective first seat cushion 142a and a second seat cushion 142b. The double occupant seat foam member 50b may include a depression 194 for receiving the double occupant seatback frame 46b. The double occupant seatback frame 46b may include a tubular structure. As such, the double occupant seat 18b may be conveniently assembled with few parts.

With reference to FIG. 12, a double occupant seat 18b that may include the parts shown in FIG. 11 is shown.

Figure 13:
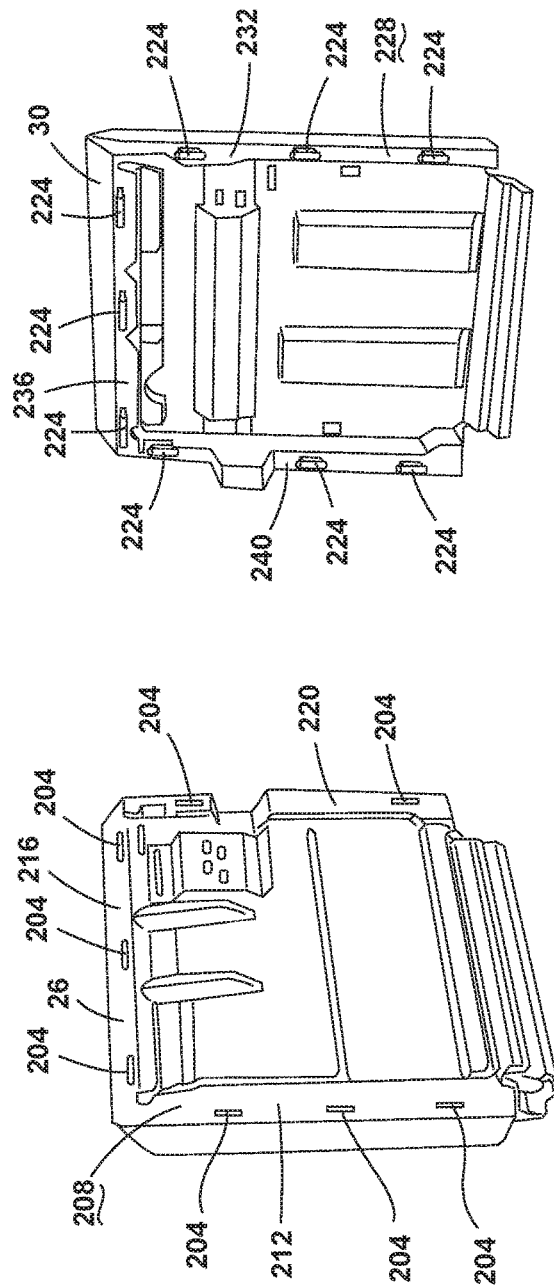
FIG. 13 is a back perspective view of a first seatback foam member, according to an embodiment.

With reference to FIGS. 13-16, an interference fit 200 (FIG. 17) may couple the first seatback foam member 26 to the second seatback foam member 30. FIG. 13 shows the first seatback foam member 26. The first seatback foam member 26 may include trenches 204 disposed on an inner surface 208 of a first seatback foam member 26. The trenches 204 may be disposed along a first side 212, a second side 216, and a third side 220 of the first seatback foam member 26.

Figure 14:
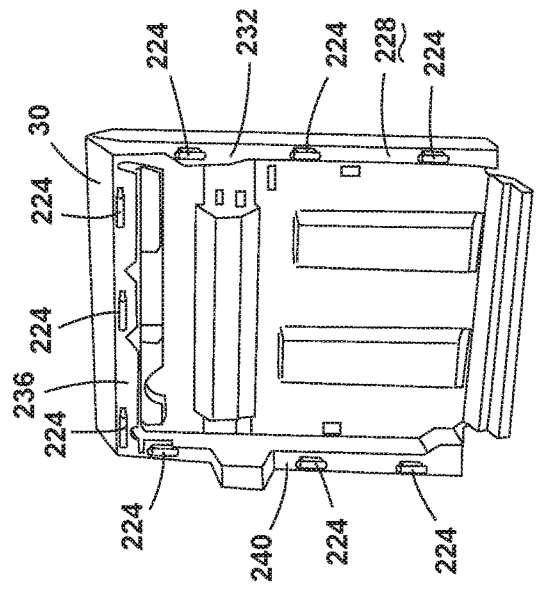
FIG. 14 is a front perspective view of a second seatback foam member, according to an embodiment.

FIG. 14 shows the second seatback foam member 30. The second seatback foam member 30 may include darts 224 disposed on an inner surface 228 of the second seatback foam member 30. The darts 224 may be disposed along a first side 232, a second side 236, and a third side 240 of the second seatback foam member 30. An interference fit 200 (FIG. 17) may be achieved by inserting the darts 224 in the corresponding trenches 204. The interference fit 200 (FIG. 17) may generally secure the first seatback foam member 26 to the second seatback foam member 30. As such, the trench and dart arrangement provides a convenient way to secure the first seatback foam member 26 to the second seatback foam member 30.

Figure 15:
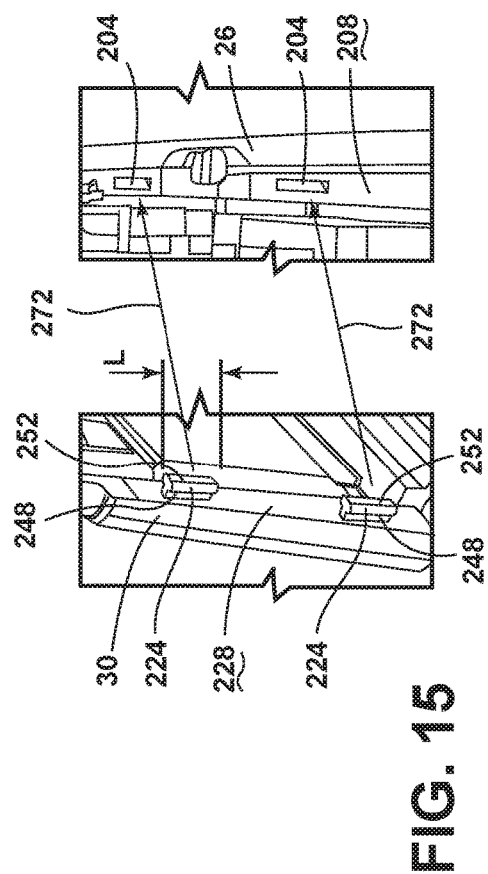
FIG. 15 is a partial front perspective view of a first seatback foam member and a second seatback foam member, according to an embodiment.

Referring now to FIG. 15, two sets of mating darts 224 and trenches 204 are shown. The two darts 224 may be disposed on an inner surface 228 of the second seatback foam member 30. The two trenches 204 may be disposed on an inner surface 208 of the first seatback foam member 26. The darts 224 may be elongated, and the trenches 204 may be elongated. Each dart 224 may include a base portion 248 mounted to the inner surface 228 of the second seatback foam member 30. Each dart 224 may also include a bulbous portion 252 mounted to the base portion 248 of the second seatback foam member 30. The bulbous portion 252 may stretch along the length L of the base portion 248 of the dart 224. Each trench 204 may be an elongated recess in the first seatback foam member 26. Arrows 272 depict the darts 224 and the trenches 204 that may be coupled together. As such, the properties of the trenches 204 and the darts 224 may be optimized to provide a secure interference fit 200 (FIG. 17) between the first seatback foam member 26 and the second seatback foam member 30.

Figure 16:
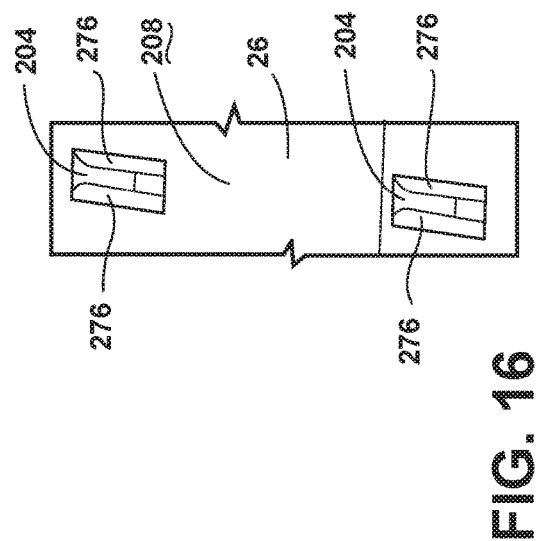
FIG. 16 is a partial rear elevational view of a first seatback foam member, according to an embodiment.

With reference now to FIG. 16, the trenches 204 may include slanted sides 276. The slanted sides 276 may facilitate the insertion of the darts 224 into the trenches 204.

With reference now to FIG. 17, a sectional view of a seatback 14 having a first seatback foam member 26 and a second seatback foam member 30 secured together by an interference fit 200 is shown. A trench 204 may be disposed in a first seatback foam member 26. A dart 224 may protrude from a second seatback foam member 30. A seatback frame 22 may be disposed in a space defined by the first seatback foam member 26 and the second seatback foam member 30. As previously discussed, the trench 204 may include a first width $W_1$ proximate the inner surface 208 of the first seatback foam member 26. The trench 204 may include a second width W2 proximate the interior 268 of the first seatback foam member 26. The second width W2 may be wider than the first width $W_1$. The second width W2 may define an elongated aperture for receiving the bulbous portion 252 of a corresponding dart 224. The first width $W_1$ may define an elongated aperture for receiving the base portion 248 of a corresponding dart 224. The sides 276 of the trench 204 may be slanted.

With reference to FIG. 18, a sectional view of the seat 18 is shown. As previously discussed, a seat frame 46 in the shape of a tubular member may be disposed in a depression 170 in the seat 18.

Figure 19:
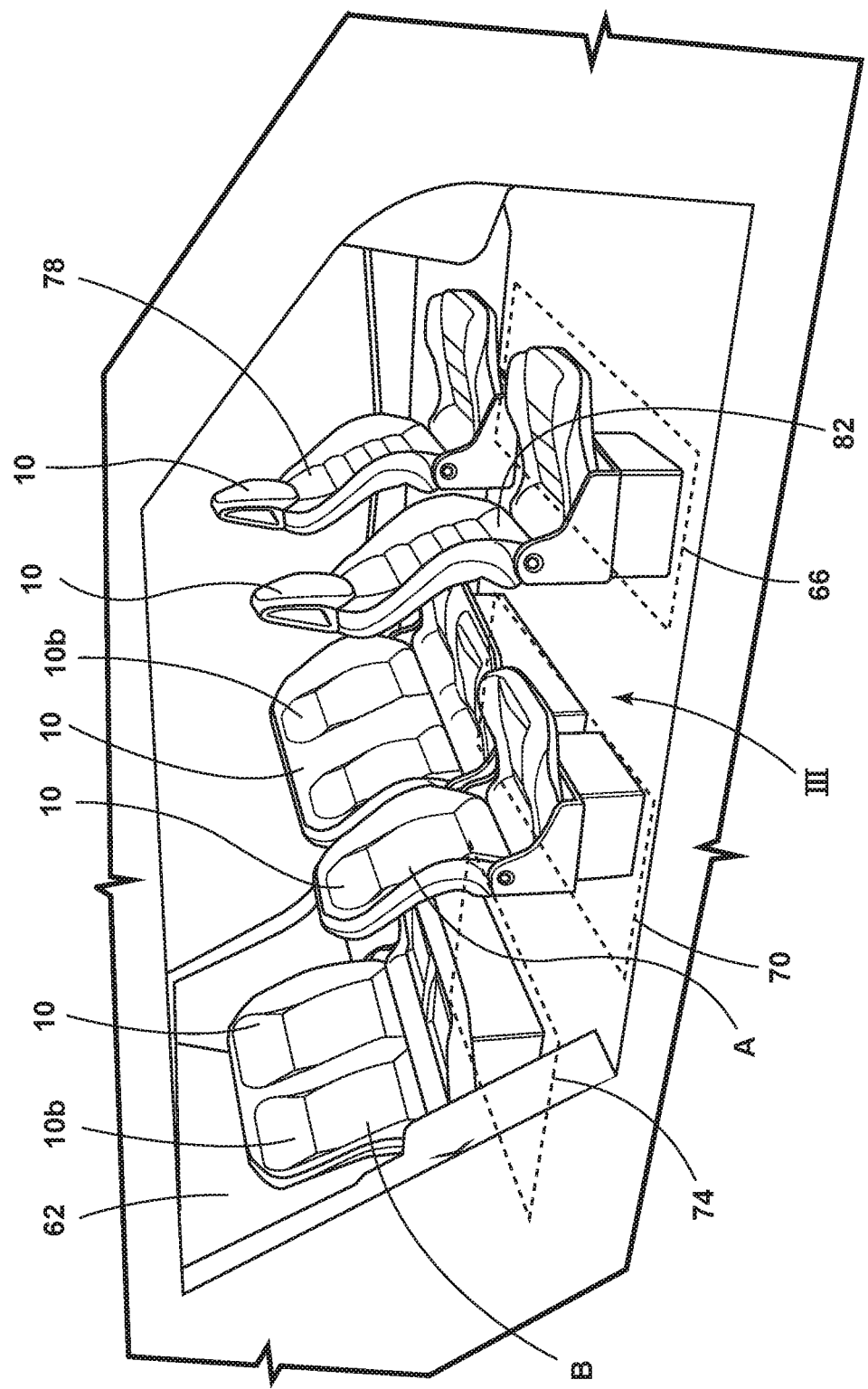
FIG. 19 is a perspective view of a vehicle cabin with a third seating arrangement, according to an embodiment.

Referring to FIG. 19, a vehicle cabin 62 with a third seating arrangement III is shown. The vehicle cabin 62 may include seating assemblies 10 arranged in a front row 66, a middle row 70, and back row 74. The front row 66 may include a driver seating assembly 78 and a passenger seating assembly 82. The middle row 70 may include a first single occupant seating assembly A and a double occupant seating assembly 10b. The back row 74 may include a double occupant seating assembly 10b.

Figure 20:
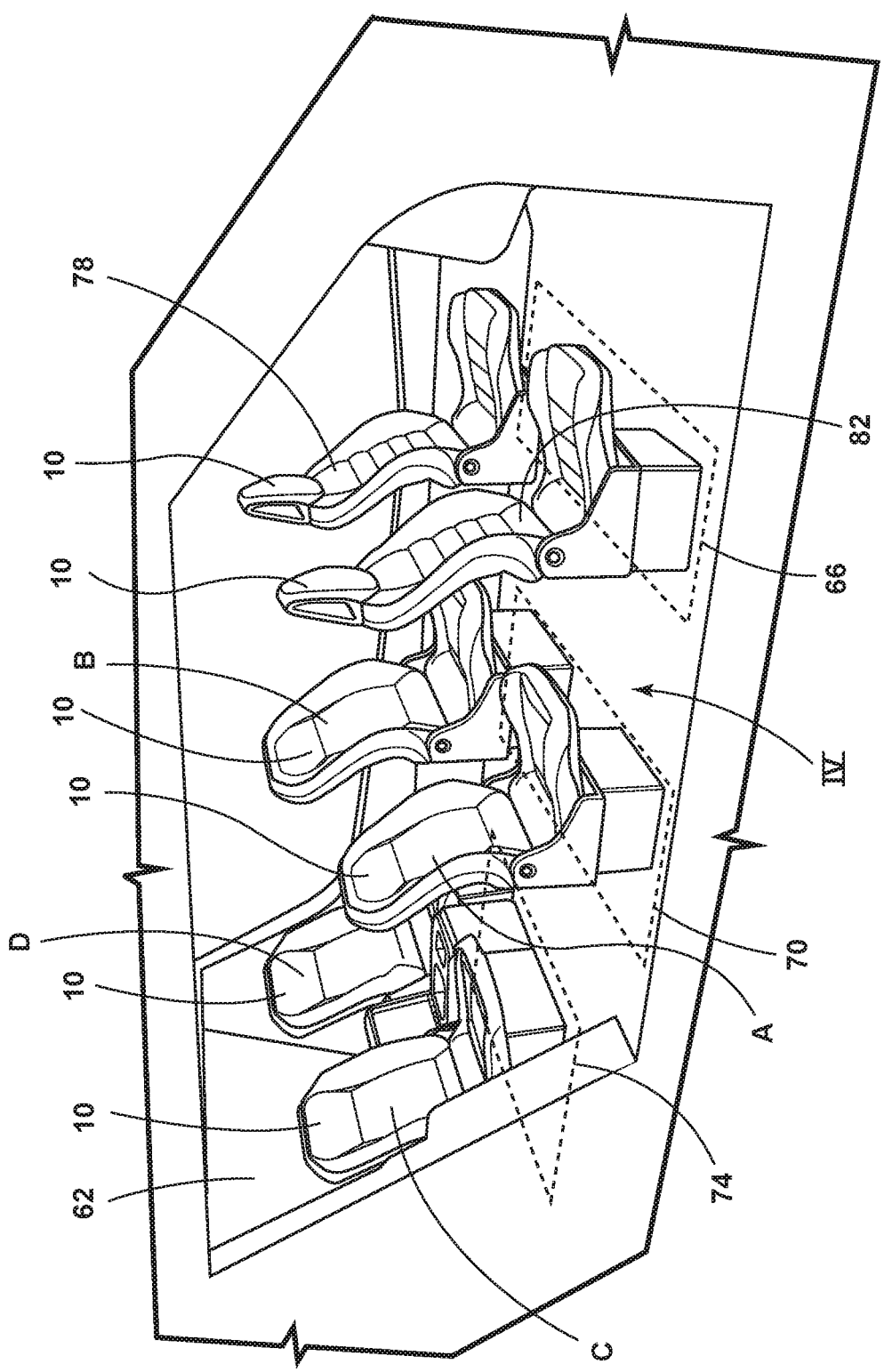
FIG. 20 is a perspective view of a vehicle cabin with a fourth seating arrangement, according to an embodiment.

Referring to FIG. 20, a vehicle cabin 62 with a fourth seating arrangement IV is shown. The vehicle cabin 62 may include seating assemblies 10 arranged in a front row 66, a middle row 70, and a back row 74. The middle row 70 may include a first single occupant seating assembly A and a second single occupant seating assembly B. The back row 74 may include a third single occupant seating assembly C and a fourth single occupant seating assembly D.

With reference to FIGS. 1-2 and FIGS. 19-20, the first seating arrangement I, the second seating arrangement II, the third seating arrangement III, and the fourth seating arrangement IV are shown. In various embodiments, the front row 66 may be a first row of a vehicle cabin 62, the middle row 70 may be a second row of a vehicle cabin 62, and the back row 74 may be a third row of a vehicle cabin 62. It is contemplated that in various examples, single occupant seating assemblies 10a with interchangeable single occupant seatbacks 14a and single occupant seats 18a may be arranged in various vehicle cabin 62 locations. Similarly, it is contemplated that in various examples, double occupant seating assemblies 10b with interchangeable double occupant seatbacks 14b and double occupant seats 18b may be arranged in various vehicle cabin 62 locations. Also, interchangeable seatbacks 14 and interchangeable seats 18 having configurations other than single occupant seating assemblies 10a and double occupant seating assemblies 10b may be disposed in various vehicle cabin 62 locations.

Referring to FIGS. 1-20, the foam members (single occupant seatback first foam member 26a, single occupant seatback second foam member 30a, single occupant seat foam member 50a, double occupant seatback first foam member 26b, double occupant seatback second foam member 30b, double occupant seat foam member 50b) may be made of various foams that may be moldable. In one example the foam members are made of an EPP (Expanded Polypropylene) foam. Trim attachments may be integrated into the foam members (single occupant seatback first foam member 26a, single occupant seatback second foam member 30a, single occupant seat foam member 50a, double occupant seatback first foam member 26b, double occupant seatback second foam member 30b, double occupant seat foam member 50b) for securing the respective trim assemblies (single occupant seatback trim assembly 34a, single occupant seat trim assembly 54, a double occupant seatback trim assembly 34b, and double occupant seat trim assembly 54b) to the respective foam members (single occupant seatback first foam member 26a, single occupant seatback second foam member 30a, single occupant seat foam member 50a, double occupant seatback first foam member 26b, double occupant seatback second foam member 30b, double occupant seat foam member 50b).

Referring to FIGS. 1-20, the frames (single occupant seatback frame 22a, single occupant seat frame 46a, double occupant seatback frame 22b, double occupant seat frame 46b) may be made of various materials that may provide structural support to the respective single occupant seatback 14a, single occupant seat 18a, double occupant seatback 14b, and double occupant seat 18b. In one example, one or more of the frames may be made of metal. In one example, one or more of the frames may be made of a composite.

A variety of advantages may be derived from use of the present disclosure. A seatback module and a seat module that are delivered to a vehicle assembly plant may be conveniently assembled into a seating assembly and installed in a vehicle at the assembly plant. An inventory of interchangeable seatback modules and interchangeable seat modules may be maintained at the vehicle assembly plant for installing one or more seating assemblies in a vehicle. For example, four single occupant seating assemblies may be assembled from four interchangeable single occupant seatbacks and four interchangeable single occupant seats and positioned in back and middle seat rows of a vehicle. Similarly, three single occupant seating assemblies and one double occupant seating assembly may be assembled from three interchangeable single occupant seatbacks, three interchangeable single occupant seats, one double occupant seatback, and one double occupant seat and positioned in back and middle rows of a vehicle cabin. Thus, use of interchangeable seatback modules and interchangeable seat modules for vehicle seating assemblies may simplify the vehicle assembly process. Use of interchangeable seatback modules and interchangeable seat modules may also reduce the number of operators involved in the vehicle assembly process. Use of interchangeable seatback modules and interchangeable seat modules may reduce the time required to assemble a seating assembly and a vehicle. Interchangeable seat cushions that may be placed in similarly sized cutaway portions of single occupant seats, double occupant seats, and other seats may increase the efficiency of the seating assembly process.

It is to be understood that variations and modifications can be made on the afore-mentioned structure without departing from the concepts of the present disclosure, and further it is to be understood that such concepts are intended to be covered by the following claims unless these claims by their language expressly state otherwise.

What is claimed is:

1. A vehicle seating assembly comprising:
    a seat including:
        a seat frame;
        a seat foam member;
        a seat trim assembly disposed over the seat foam member; and
        a seat connector; and
    a seatback including:
        a seatback frame;
        separate first and second seatback foam members joined together around the seatback frame;
        a seatback trim assembly disposed over the first and second seatback foam members; and
        a seatback connector operably coupled to the seat connector.

2. The vehicle seating assembly of claim 1, further comprising an interference fit between the first and second seatback foam members.

3. The vehicle seating assembly of claim 2, wherein the interference fit includes a trench and dart arrangement.

4. The vehicle seating assembly of claim 1, wherein the first seatback foam member is a front seatback foam member.

5. The vehicle seating assembly of claim 4, wherein the second seatback foam member is a rear seatback foam member.

6. The vehicle seating assembly of claim 1, wherein the seat frame includes a tubular member, and wherein the seat foam member includes a depression configured to receive the tubular member.

7. The vehicle seating assembly of claim 1, wherein the seat foam member includes a cutaway portion configured to receive a seat cushion.

8. The vehicle seating assembly of claim 1, wherein the vehicle seating assembly includes a bench seating assembly.

9. The vehicle seating assembly of claim 8, wherein the bench seating assembly includes a seat foam member having first and second cutaway portions for receiving respective first and second seat cushions.

10. The vehicle seating assembly of claim 1, wherein the vehicle seating assembly is one of a plurality of vehicle seating assemblies, the seat is one of a plurality of seats, and the seatback is one of a plurality of seatbacks, and the plurality of seats and the plurality of seatbacks are interchangeable among the plurality of vehicle seating assemblies.

11. A vehicle comprising:
    first, second, third, and fourth seating assemblies;
    a first cabin location configured to receive one or more of the first, second, third, and fourth seating assemblies; and
    a second cabin location configured to receive one or more of the first, second, third, and fourth seating assemblies, wherein the first, second, and third seating assemblies include interchangeable seats and interchangeable seatbacks, wherein the first cabin location includes a first seating row and wherein the second cabin location includes wherein the first, second, and third seating assemblies include single occupant seating assemblies; wherein the fourth seating assembly includes a double occupant seating assembly; and wherein the single occupant seating assemblies each comprises a seat foam member including a cutaway portion for receiving a seat cushion and wherein the double occupant seating assembly comprises a seat foam member including first and second cutaway portions for receiving first and second seat cushions, wherein the seat cushions received by the single occupant seating assemblies are interchangeable with the first and second seat cushions received by the double occupant seating assemblies.

12. The vehicle of claim 11, wherein the interchangeable seats include a seat foam member and a tubular support structure disposed within a channel in the seat foam member.

13. The vehicle of claim 11, wherein the interchangeable seatbacks include first and second seatback foam members surrounding a seatback frame.

14. The vehicle seating assembly of claim 11, wherein the first seating row includes two of the first, second, third, and fourth seating assemblies and wherein the second seating row includes two of the first, second, third, and fourth seating assemblies.

15. A vehicle seating assembly comprising:
    a seat including:
        a molded seat foam member defining an open seat section and including a seat frame;
        a seat trim assembly coupled to a seating surface of the molded seat foam member; and
        a seat cushion disposed in the open seat section; and
    a seatback including:
        a molded seatback foam member defining an open seatback section and including a seatback frame;
        a seatback trim assembly coupled to a seating surface of the molded seatback foam member; and
        a seatback cushion disposed in the open seatback section.

16. The vehicle seating assembly of claim 15, wherein the seat trim assembly is disposed between the molded seat foam member and the seat cushion.

17. The vehicle seating assembly of claim 15, wherein the seat is one of a plurality of seats, wherein the seatback is one of a plurality of seatbacks, and wherein any one seat of the plurality of seats and any one seatback of the plurality of seatbacks may be combined to form a vehicle seating assembly disposed in a first cabin location or a second cabin location.

\* \* \* \* \*